United States Patent [19]
Kelm

[11] Patent Number: 5,176,480
[45] Date of Patent: Jan. 5, 1993

[54] BROACHING APPARATUS AND METHODS

[75] Inventor: Walter H. Kelm, Mt. Clemens, Mich.

[73] Assignee: Carboloy Inc., Warren, Mich.

[21] Appl. No.: 536,017

[22] Filed: Jun. 11, 1990

[51] Int. Cl.$^5$ ............................................. B23P 15/42
[52] U.S. Cl. ................................... 409/244; 407/15; 407/17; 409/268
[58] Field of Search ................. 409/244, 268; 407/15, 407/17, 18, 19

[56] References Cited

U.S. PATENT DOCUMENTS

| | | | |
|---|---|---|---|
| 3,641,642 | 2/1972 | Schmidt | 407/17 |
| 3,795,958 | 3/1974 | Psenka | 407/19 |
| 4,243,347 | 1/1981 | Clapp et al. | 407/15 |
| 4,564,320 | 1/1986 | Roselip | 407/15 |
| 4,993,889 | 2/1991 | Kelm | 407/15 |

Primary Examiner—Z. R. Bilinsky
Attorney, Agent, or Firm—Burns, Doane, Swecker & Mathis

[57] ABSTRACT

A broaching insert, such as a slotter or semifinisher, which cuts through a workpiece is configured such that side cutting edges of the broaching insert contact the workpiece simultaneously. If the broaching insert is a slotter, a center portion of the cutting edge which interconnects the side cutting edge makes contact with the workpiece ahead of the side cutting edges. If the insert is a semi-finisher, the side cutting edges are scalloped so as to reduce shock upon engagement with the workpiece. The broaching insert is ideally suited to the cutting of workpieces oriented obliquely relative to the direction of cutting. In order to minimize snap-back of the broaching insert as it exits the workpiece, the broaching insert is sequentially passed through back-up disks of gradually diminishing hardness, whereby the compressive loading on the insert is relieved gradually.

25 Claims, 5 Drawing Sheets

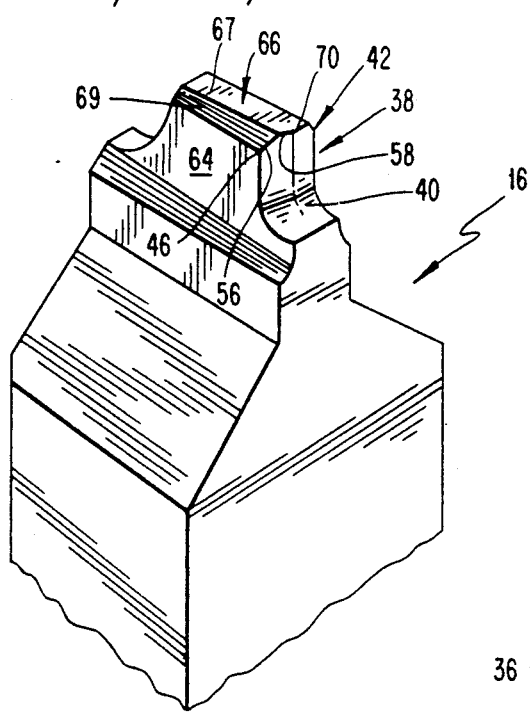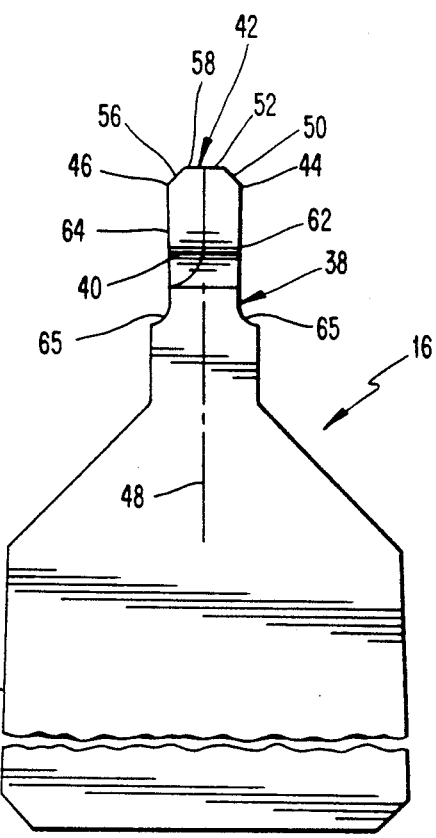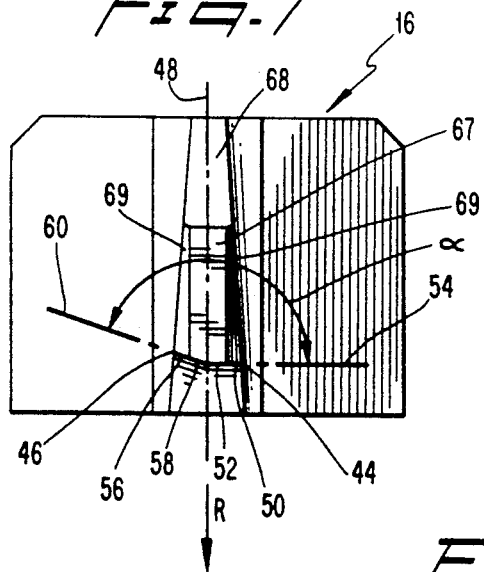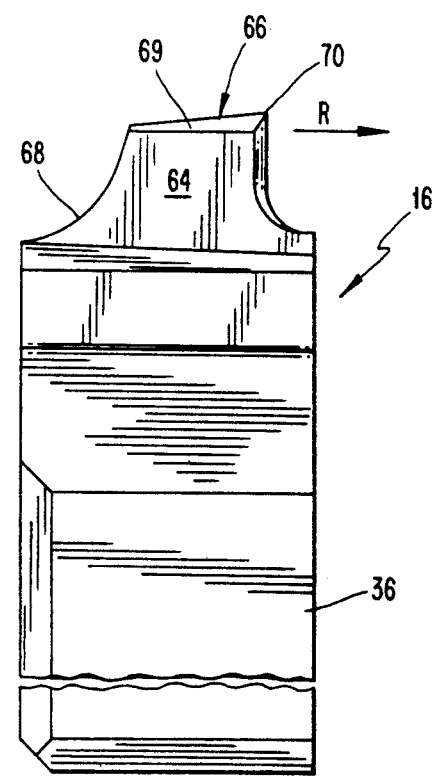

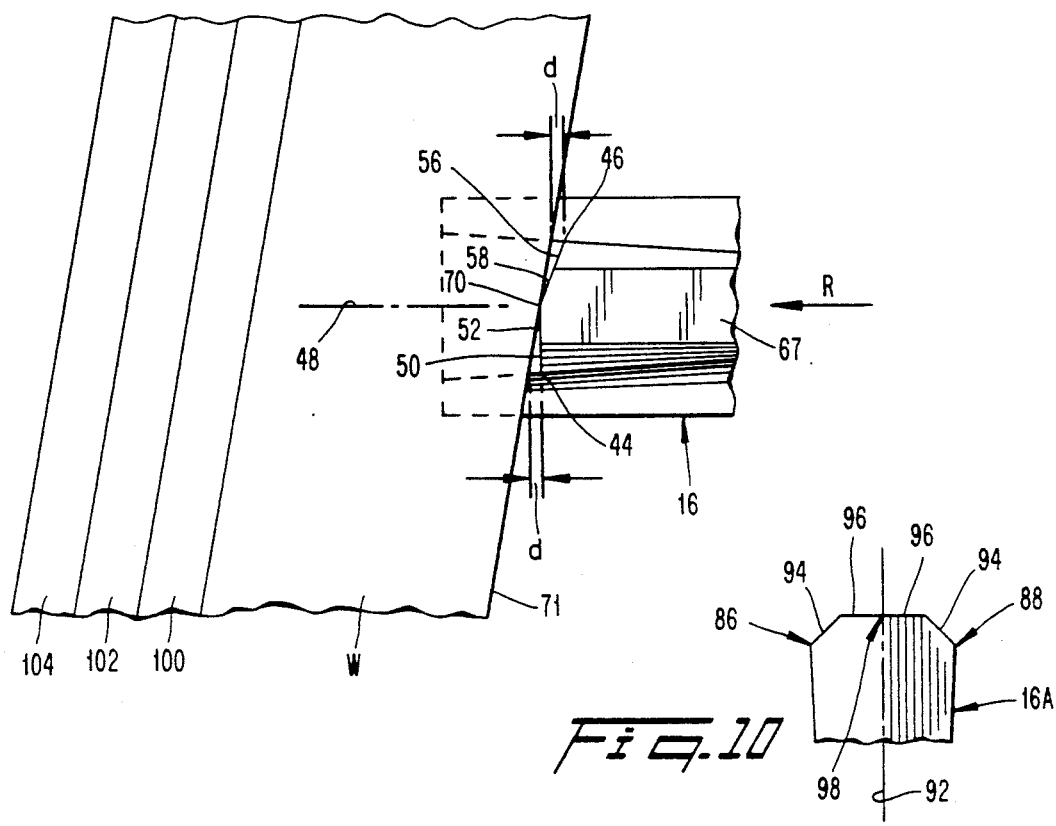
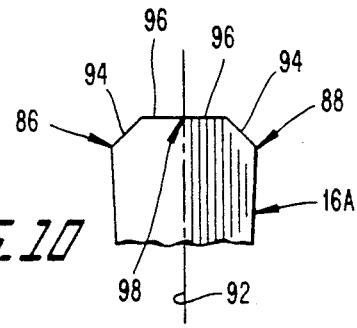
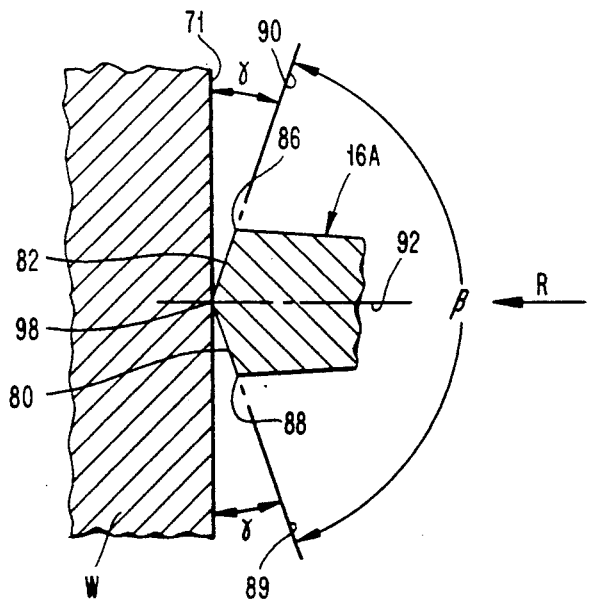
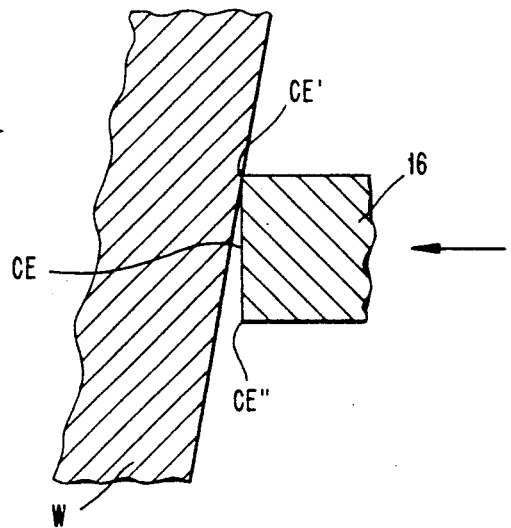

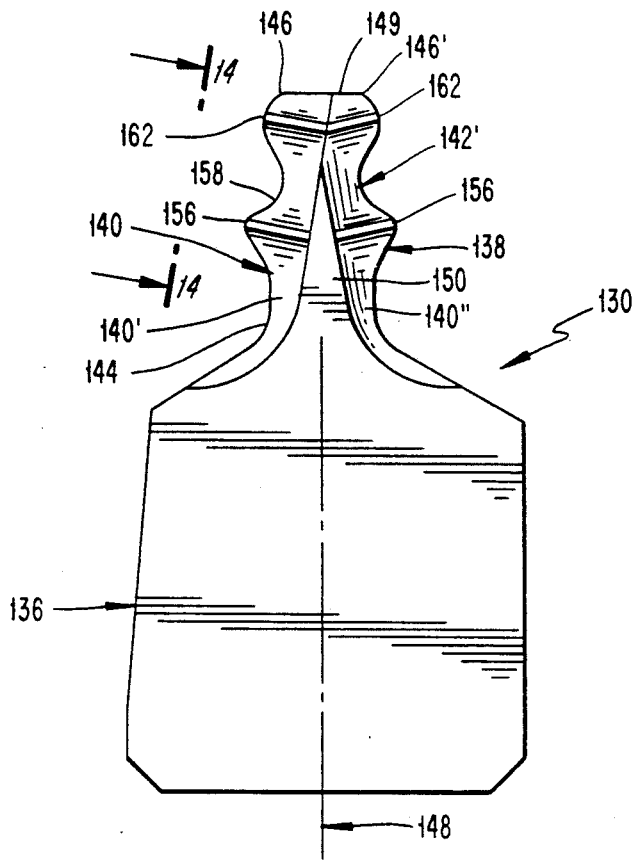
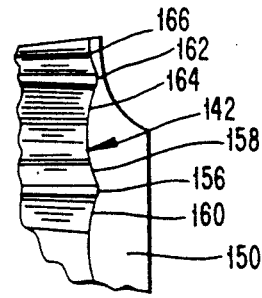
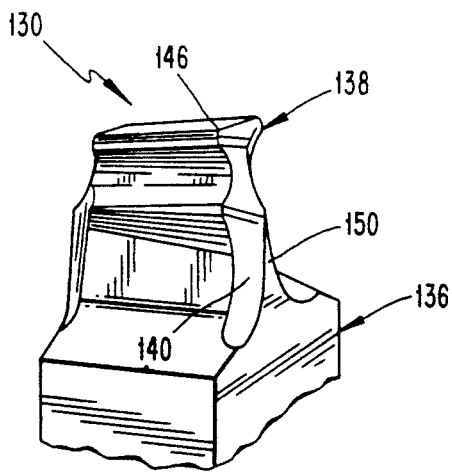
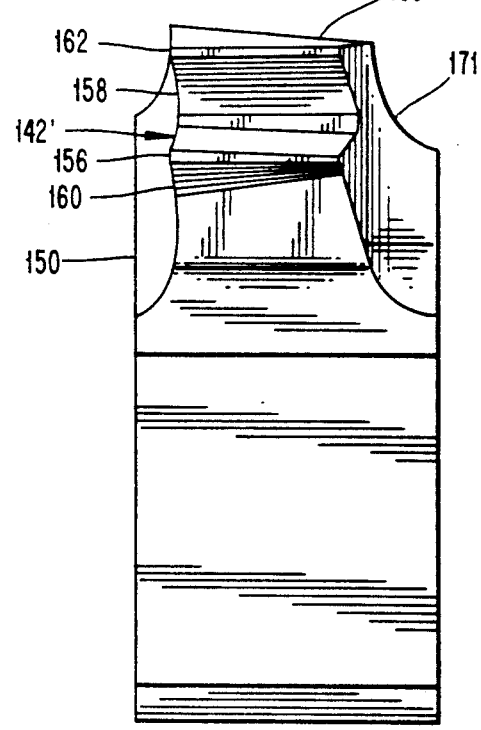

BROACHING APPARATUS AND METHODS

BACKGROUND OF THE INVENTION

The present invention is directed to broaching, especially as used for machining finished slots with a single pass, and particularly to a broaching assembly employing novel cutting inserts, and to a novel method of broaching.

Broaching tools are used for machining metal, such as for forming slots in workpieces like turbine wheels. One such broaching tool is disclosed in Clapp et al U.S. Pat. No. 4,243,347 and another is disclosed in Applicant's copending Application Ser. No. 392,260 filed Aug. 10, 1989. The broaching tool comprises a holder and a row of broaching inserts mounted in the holder.

During a broaching operation, each slot is cut progressively by sequentially contacting the workpiece with the broaching inserts or cutters, i.e., initially with inserts which rough-out the slot, an then with inserts which complete the slot. In particular, the workpiece is sequentially contacted with three different types of inserts, i.e., initially with a series of slotters, then with a series of semi-finishers, and finally with a series of finishers, each series of inserts being mounted in a respective holder. The holders are positioned in end-to-end fashion such that the workpiece is contacted successively by a single pass of the slotters, semi-finishers and finishers.

The slotters gradually rough-out a slot to a given depth by sequentially removing sections of the slot. The semi-finishers then enter the roughed-out slot and gradually widen the sides of the slot to establish the size and configuration of the slot to a degree approximating the desired final size and shape. The finishers function to remove the last film of material needed to obtain a slot within the desired narrow manufacturing tolerances.

In a typical broaching assembly approximately 60% of the cutting inserts are slotters, 30% are semi-finishers and 10% are finishers.

It is desirable that the finished slots be smooth and of as precise a configuration as possible. It is also desirable that the cutting inserts exhibit as long a life as possible due to the considerable time and expense involved in sharpening and/or replacing the numerous inserts employed in a typical broaching assembly.

During a broaching operation, numerous factors may adversely affect insert behavior in a manner making those goals difficult to achieve. One of those factors relates to the shock occurring as the insert makes contact with the workpiece which can cause chipping and breaking of the insert to chip and break.

Another factor of concern relates to the reaction of the inserts as they exit the workpiece. It will be appreciated that during a cutting phase the insert is subjected to considerable compressive loading which is suddenly released as the insert leaves the workpiece. The resultant springing-back of the insert, i.e., so-called "snap-back", can result in severe spalling and chipping of the cutting edge.

Yet another fact of concern has arisen more recently in connection with the machining of slots at an angle to the plane of the workpiece, such as a turbine wheel, whereby during the broaching operation the wheel axis is oriented non-parallel relative to the direction of travel of the broaching assembly. During such a broaching operation, one side of the cutting edge of a conventional broaching insert will contact the workpiece ahead of the other side. Such an occurrence is depicted in FIG. 12 wherein one side CE' of a cutting edge CE of a conventional slotter 16' is depicted as making contact with a tilted wheel W ahead of the other side CE". As a result, the insert is subjected to a lateral deflection toward the side CE" which will produce a slight lateral displacement of the slot inlet from its intended position. Moreover, when the slotter exits the workpiece, a lateral deflection thereof in the opposite direction will occur (i.e., toward the side CE'), thereby creating a lateral displacement of the slot outlet from its intended position. Consequently, there will exist a misalignment between the ends of the slot which is intolerable in many applications, necessitating that the slots be formed by techniques other than broaching.

The tendency for the broaching insert to be laterally displaced upon making initial contact with the wheel also applies in the case of semi-finishers and results in a thick chip being cut by one side of the semi-finishers, and a thin chip being cut by the other side. As in the case of a slotter, the semi-finisher will tend to be laterally deflected whereby the misalignment between the ends of the slot will be maintained and possibly even exaggerated. Also, a section of the semi-finished slot located intermediate its ends may be rough and irregular due to vibration of the insert resulting from the lateral deflection.

It would, therefore, be desirable to provide novel broaching inserts which produce slots within narrow tolerances and which resist premature chipping, breaking, and spalling.

It would also be desirable to provide novel broaching inserts which minimize the imposition of vibration, lateral deflection, and shock to the insert.

It would be further desirable to provide novel broaching methods which control the snap-back of broaching inserts exiting a workpiece.

SUMMARY OF THE INVENTION

One aspect of the present invention involves a broaching insert for cutting a slot in the workpiece. The insert comprises a base portion adapted to be mounted in a tool holder, and a cutter portion projecting from the base portion in a direction transversely relative to a forward direction of cutting. The cutter portion includes a chip face facing in the forward direction, and side cutting edges which border portions of the chip face and which are spaced apart on opposite sides of a center plane of the insert, the center plane passing through the base portion and to the chip face. One of the side cutting edges is spaced forwardly relative to the other of the side cutting edges.

The broaching insert may constitute a slotter, wherein the side cutting edges are interconnected by an end cutting edge which is disposed remotely from the base portion. The cutting edge, as defined by the side and end cutting edges is non-linear and defines a rearwardly open angle as viewed in a direction parallel to the center plane and perpendicular to the cutting direction. That angle is less than 180°.

The broaching insert could comprise a slot-completing insert, wherein each of the side cutting edges includes at least one scalloped region defined by a portion disposed forwardly relative to immediately adjacent portions in order to minimize shock as the cutting edges engage a workpiece.

Another aspect of the invention involves a broaching method for forming a slot in a workpiece. The method comprises the steps of effecting relative linear movement between a workpiece and a broaching insert in a direction of cutting, with a face of the workpiece oriented obliquely relative to the direction of cutting. A pair of side cutting edges of the broaching insert contact the workpiece simultaneously.

Yet another aspect of the present invention involves a broaching method for cutting a slot in a workpiece, comprising the steps of effecting relative linear movement between the workpiece and a slotter type of broaching insert in a direction of cutting in order to cause a cutting edge of the slotter insert to engage a face of the workpiece such that a center portion of the cutting edge contacts the workpiece ahead of side portions of the cutting edge. In such a case, the face of the workpiece can be oriented obliquely or perpendicularly relative to the direction of cutting.

A further aspect of the invention involves a method of broaching wherein a broaching insert is passed linearly through a workpiece from a front face to a rear face thereof to form a slot extending completely through the workpiece. The method includes the step of gradually releasing a compressive load on the broaching insert when the insert exits the workpiece by passing the inserts sequentially through a plurality of back-up disks disposed at the rear face of the workpiece. The back-up disks are of less hardness than the workpiece and are of sequentially reduced hardness relative to each other, whereby the compressive loading on the insert upon exiting the workpiece is gradually relieved as the insert sequentially passes through the backup disks.

BRIEF DESCRIPTION OF THE DRAWINGS

The objects and advantages of the invention will become apparent from the following description of preferred embodiments thereof in connection with the accompanying drawings, in which like numerals designate like elements, and in which:

FIG. 5 is a front perspective view of a slotter type broaching insert in accordance with the present invention;

FIG. 6 is a front elevational view of the slotter depicted in FIG. 5;

FIG. 7 is a top plan view of the slotter shown in FIG. 5;

FIG. 8 is a side elevational view of the slotter shown in FIG. 5;

FIG. 9 is a top plan view of the slotter of FIG. 5 as it approaches a tilted workpiece;

FIG. 10 is a front elevational view of a modified slotter according to the present invention;

FIG. 11 is a top plan view of a workpiece and the modified slotter of FIG. 10 showing the modified slotter approaching a tilted workpiece;

FIG. 12 is a view similar to FIG. 9 depicting a prior art slotter;

FIG. 13 is a front elevational view of a semi-finisher finisher type of broaching insert according to the present invention;

FIG. 14 is a view taken along the line 14—14 in FIG. 13;

FIG. 15 is a front perspective view of the semi-finisher of FIG. 13;

FIG. 16 a side elevational view of the semi-finisher according to FIG. 13;

DETAILED DESCRIPTION OF PREFERRED EMBODIMENTS OF THE INVENTION

Figure 1:
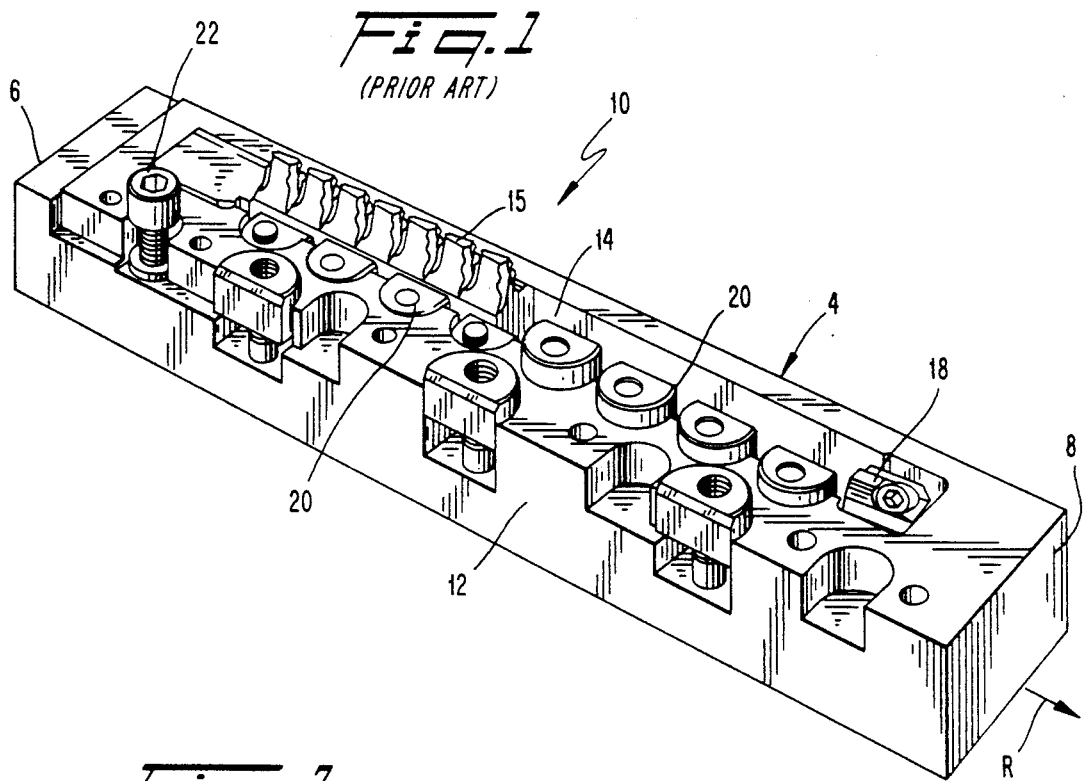
FIG. 1 is a perspective view of a conventional broaching tool partially loaded with broaching inserts.

Referring to the drawings and in particular to FIG. 1, a conventional broaching tool 10 includes a holder 12 forming an elongated cavity 14 for housing therein a plurality of broaching inserts 15. The number of cutting inserts 15 contained within the cavity 14 is limited only by the length of the cavity 14 and the thickness of the inserts 15. A spacer bar (not shown) is provided to occupy any remaining length of the cavity 14 and is forced against the foremost cutting insert 15 by a clamp 18. As described in U.S. Ser. No. 392,260 a plurality of semi-circular wedges 20 may be provided to wedgingly secure adjacent inserts 15 within the elongated cavity 14. Bolts 22 are provided for anchoring the holder to a support (not shown).

Only one broaching tool 10 is depicted in FIG. 1. In practice, however, a plurality of broaching tools 10 would be arranged in end-to-end relationship to sequentially cut a slot in the workpiece in response to relative movement between the workpiece and the broaching assembly in a direction of cutting R. After the slot has been cut, the workpiece, such as a turbine wheel W, would be indexed about its axis, whereupon the broaching inserts would again be passed through the workpiece to cut another slot spaced circumferentially from the previously cut slot.

Figure 2:
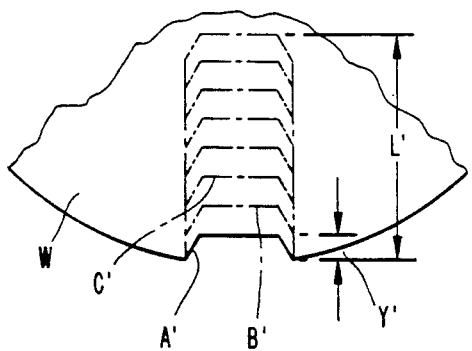
FIG. 2 is a partial side view of a wheel-shaped workpiece showing the sequential roughing-out of a slot by successive slotters.

One or more of the initial broaching tools would contain a slotter type of insert which would progressively rough-out a groove of prescribed depth (slot "depth" being measured in the radial direction of the wheel). The slotters project from the cavity 14 by progressively greater distances so that each slotter engages a portion of the workpiece which was not engaged by the preceding slotter. That is indicated for example in FIG. 2 wherein a first cut A' in a workpiece is made by the leading slotter. Thereafter, cuts B', C', D', etc., would be made by the successively positioned slotters until a roughed-out slot S' of the prescribed depth L' is reached (see also FIG. 3).

Figures 3, 4:
FIG. 3 is a fragmentary cross-sectional view through a wheel-shaped workpiece showing a slot previously roughed-out by slotters.
FIG. 4 is a view similar to FIG. 3 after the roughed-out slot has been completed by semi-finishers and finishers.
Figure 17:
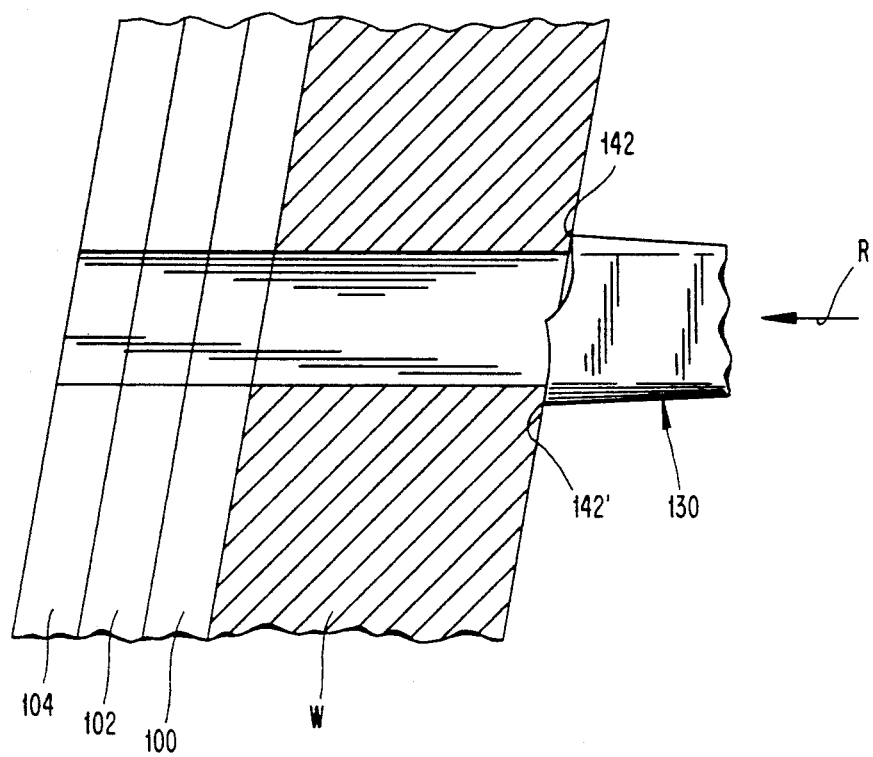
FIG. 17 is a fragmentary cross-sectional view taken through a workpiece showing the semi-finisher approaching a pre-roughed-out slot in a tilted workpiece.
Figure 18:
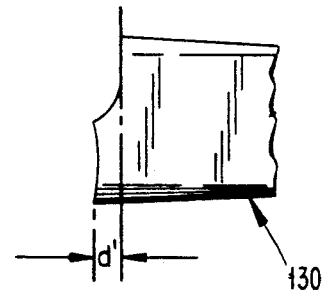
FIG. 18 is a plan view of the semi-finisher of FIG. 13.

Following the slotters, the wheel W would be acted upon by the slot-completing inserts, i.e., semi-finishers and finishers, carried by respective holders 12. The completing inserts act primarily on the sides of the slot to progressively widen and configure the slot to form a finished slot S" as depicted in FIG. 4.

Slotters 16, 16A according to the present invention will be discussed in connection with FIGS. 5-11, and a semi-finisher 130 will be discussed in connection with FIGS. 13-19

Turning now to FIGS. 5-9, a slotter 16 according to the present invention comprises a base portion 36 and a cutter portion 38 projecting therefrom. The base portion 36 is configured to fit within the cavity 14 of the holder 12. The cutter portion includes a chip face 40 facing forwardly in the linear direction of cutting R. A cutting edge 42 borders a free end portion of the cutter portion disposed remotely of the base portion 36. That cutting edge 42 extends continuously from point 44 to point 46. Those points 44, 46 are located on opposite sides of a center plane 48 of the slotter, which plane intersects the cutting edge 42 and passes through the base portion 36 and the chip face 40 of the cutter portion 38. The cutting edge 42 includes a first portion extending from the center plane 48 to the first point 44 and a second portion extending from the center plane 48 to the second point 46. The first cutting edge portion includes a side section 50 and an end section 52 lying in a common first reference plane 54 (as the insert is viewed in plan in FIG. 7). Similarly, the second cutting edge portion includes a side section 56 and an end section 58 lying in a common second plane 60. Those planes 54, 60 intersect at the center plane 48 to form a rearwardly opening angle α which is less than 180°.

The first plane 54 is oriented perpendicular to the center plane 48, which means that the second plane 60 is angled rearwardly from the center plane, i.e., away from the workpiece. Thus, the cutting edge is of non-symmetrical configuration relative to the center plane 48.

The side section 50 is inclined relative to the associated end sections 52 in a direction toward the base portion 36 of the slotter as the insert is viewed from the front (FIG. 6). A similar relationship exists between the side and end sections 56, 58. During a cutting operation, the side sections rough-out the sides of the slot, and the end sections 52, 58 rough-out the floor or bottom of the slot.

The cutter portion 38 also includes a pair of side faces 62, 64 which converge toward the center plane 48 to form a slight clearance angle as viewed in FIG. 6. The side faces 62, 64 terminate in shoulders 65. An end face 66 of the cutter portion extends rearwardly from the cutting edge 42 at an inclination toward the base 36 to also form a slight clearance angle (see FIG. 8). The end face 66 includes a first portion 67 extending rearwardly from the end sections 52, 58 of the cutting edge, and beveled portions 69 extending rearwardly from the side sections 50, 56 of the cutting edge. The rear of the cutter portion 36 is recessed at 68 to form a space ahead of a trailing insert in the holder for conducting away chips.

The action of the slotter 16 during the cutting of a tilted workpiece W is depicted schematically in FIG. 9. It will be appreciated that initial contact between the cutting edge and the surface of the workpiece occurs at the center of the cutting edge, i.e., at the point of intersection 70 of the first and second cutting edge portions. The chip face is raked slightly rearwardly to ensure that the initial contact occurs at the point 70. Therefore, the slotter 16 is subjected to a minimal amount of shock and no appreciable lateral deflection forces. As the cutting proceeds, along the cutting direction R, the end sections 52, 58 of the cutting edge progressively shear through the workpiece, and then the side sections 50, 56 progressively shear through the workpiece. The angle α defined by the planes 54 and 60 (FIG. 7) is sized to ensure that the end points 44 and 46 of the cutting edge are spaced equal distances d from the front face 71 of the wheel W when the point 70 makes initial contact therewith. This means that the insert is subjected to symmetrical reaction forces on opposite sides of the center plane 48 as the cutting edge cuts through the workpiece, and the end points 44, 46 reach the workpiece face 71 simultaneously. Accordingly, no appreciable lateral forces will be applied to the insert which would laterally deflect the insert from its intended path of travel.

It will be appreciated that the afore-described principles of the slotter design according to the present invention also have utility in a slotter 16A intended to cut slots in a non-tilted workpiece, as depicted in FIGS. 10 and 11. That slotter 16A has a cutting edge extending from point 86 to point 88. The cutting edge comprises two identical cutting edge portions 80, 82 lying in planes 89, 90 which intersect at the center plane 92 of the insert. The planes 89, 90 form a rearwardly opening angle β less than 180°, which angle is bisected by the center plane 92. Thus, the cutting edge is configured symmetrically relative to the center plane. Each cutting edge portion comprises an end section 96 and a side section 94 angled therefrom toward the base (not shown).

It will be appreciated that the slotter 16A makes initial contact with the non-tilted workpiece W at the point of intersection 98 of the cutting edge portions. Since the planes 88, 90 of the cutting edge portions from identical angles with the surface of the workpiece, the points 86 and 88 will be spaced by equal distances from the wheel face 69 and will contact that face simultaneously. Hence, the cutting edge portions will shear through the workpiece in a manner producing symmetrical reaction forces on the insert, whereby the insert will be subjected to minimal shock and no appreciable lateral deflection forces.

It will also be appreciated that the slotters 16, 16A are subjected to considerable compressive loading as they pass through the workpiece. In order to prevent the compression from being suddenly relieved when the inserts exit the workpieces, whereby the inserts would tend to recoil or snap-back forwardly with sufficient force to produce spalling of the insert, the inserts are passed sequentially through a series of back-up disks 100, 102, 104 in accordance with the present invention. Those back-up disks are of the same diameter as the wheel W and have hardness values less than the workpiece, those hardness values of the disks are sequentially diminishing. Hence, the compressive loading on the inserts is only gradually relieved as the inserts pass through the successively softer disks. For example, the Brinell hardness value of the disk 100 could be 50 less than that of the workpiece W; the disk 102 could be 50 less than that of the disk 100, and so on, whereby the inserts encounter successive materials of Brinell hardness values which decrease by increments of 50.

As discussed earlier, after the slotters 16 (or 16A) have roughed out a slot, they are followed by the slot completing inserts, i.e., semi-finishers and finishers, which widen and reshape the sides of the slot, e.g., to a fir-tree shape in the disclosed preferred embodiment. A semi-finisher 130 according to the present invention is depicted in connection with FIGS. 13 to 19. That semi-finisher comprises a base portion 136 and a cutter portion 138 projecting therefrom. The base portion 136 is configured to fit within the cavity 14 of the holder 12. The cutter portion includes a chip face 140 facing forwardly in the direction of cutting. A pair of identical side cutting edges 142, 142' are provided which extend along opposite sides of the chip face 140 on opposite sides of a center plane 148. Each side cutting edge extends from a point 144 (or 144') to a point 146 (or 146') on the cutter portion 138. The points 146, 146', located remotely of the base portion 136, are interconnected by an end edge 149 of the cutter portion 138. The edges together define a fir-tree shape, but of course other shapes could be formed, depending upon the desired shape of the slot being cut.

While the semi-finishers cut primarily along their side cutting edges, a minor amount of cutting may be performed by the end edge 149 in order to somewhat reshape the bottom of the slot.

Figure 19:
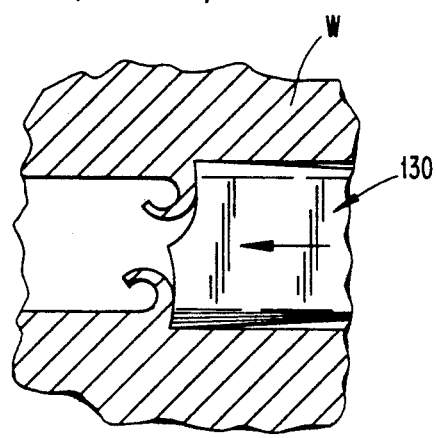
FIG. 19 is a cross-sectional view taken through a workpiece showing the chip flow along the semi-finisher.

The chip face 140 is divided into right and left hand portions 140', 140" by a center flange 150 which extends along the center plane 148. The center flange 150 preferably terminates just short of the end edge 149. As can be seen in FIG. 19, the chip faces function to guide chips which are cut from the sides of the pre-formed slot S' of the workpiece (i.e., the slot previously roughed-out by the slotters 16).

The semi-finisher 130 is adapted for use in cutting a tilted workpiece W. Accordingly, one of the side cutting edges 142' is disposed forwardly relative to the other side cutting edge 142 by a distance d' which is dimensioned in accordance with the tilt angle of the workpiece in order to ensure that the side cutting edges simultaneously engage the wheel face 71. As a result of such a non-symmetrical arrangement of the side cutting edges relative to the center plane 148, there will occur no appreciable lateral forces tending to laterally displace the semi-finisher.

Furthermore, each side cutting edge is configured to minimize the amount of shock generated when making contact with the face 71. This is achieved in that each of the side cutting edges includes a pair of scalloped regions. Each scalloped region includes a portion of each side cutting edge is located forwardly of immediately adjacent portions of that side cutting edge. For example, with reference to FIG. 14, a portion 156 of the side cutting edge 142 is located forwardly (i.e., forwardly considered with reference to the direction of cutting) relative to immediately adjacent portions 158, 160, the latter portions being curved rearwardly away from the forwardly advanced portion 156. Also, a portion 162 of the cutting edge 142 (which is spaced farther from the base portion 136 than the afore-mentioned cutting edge portion 156) is disposed forwardly of immediately adjacent portions 164, 166, the latter portions curving rearwardly away from the portion 162. As a result of such a scalloped configuration, the cutting edge portions 156, 162 contact the workpiece face in advance of the portions 158, 160, 164, 166 so that the cutting forces are concentrated at the portions 156, 162. As the insert thereafter advances, the portions 158, 160, 164, 166 will progressively contact the workpiece face. Consequently, the initial shock acting on the semi-finisher is substantially less than would be the case if most or all of the side cutting edge simultaneously engaged the workpiece.

It will be appreciated that the curvature of the portions 158, 160, 164, 166 (and thus also the curvature of the corresponding portions of the chip face 140) will cause the chips to be deflected generally away from the respective ones of the advanced portions 156, 162. Thus, the chips have a direction of travel extending away from the portions 156, 162 in FIG. 13.

Although the scalloped regions have been disclosed in conjunction with a slot-completing broaching insert which engages a tilted workpiece, they could also be used on a slot-completing broaching insert which engages a non-tilted workpiece, in order to minimize shock.

An end face 169 of the semi-finisher is raked rearwardly from the cutting edge to form a clearance angle, and the rear side 171 of the semi-finisher is recessed to provide a space ahead of the succeeding semi-finisher for the removal of chips.

It will be appreciated that the present invention enables slots of high accuracy and dimensional tolerance to be cut. The shock acting on the inserts is minimized, and no appreciable lateral forces are imposed on the inserts. Furthermore, the compressive loading on the inserts is progressively dissipated as the inserts exit the workpiece by passing the inserts through a plurality of successively softer back-up disks. Hence, premature spalling and breakage of the inserts is resisted.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A slot-type broaching insert for cutting a slot in a workpiece, comprising:
    a base portion adapted to be mounted in a tool holder, and
    a cutter portion projecting from said base portion in a direction transversely relative to a forward direction of cutting, said cutter portion including
        a chip face facing in the forward direction of cutting, and
        side cutting edges bordering portions of said chip face and spaced apart on opposite sides of a center plane of said insert which passes through said base portion, and said chip face, one of said side cutting edges being spaced forwardly relative to the other of said side cutting edges, said side cutting edges being interconnected by an end cutting edge disposed remotely from said base portion, said cutting edge defined by said side and end cutting edges being non-linear and defining a rearwardly open angle as viewed in a direction parallel to said center plane and perpendicular to said cutting direction, said angle being less than 180 degrees.

2. A broaching insert according to claim 1, wherein said broaching insert comprises a slot-completing insert for widening and shaping a previously formed slot, each of said side cutting edges including at least one scalloped region defined by a portion disposed forwardly relative to immediately adjacent portions in order to minimize shock as cutting edges engage a workpiece.

3. A broaching insert according to claim 2, wherein each of said side cutting edges includes two scalloped regions.

4. A slotter type broaching insert for cutting a slot in a workpiece comprising:

a base portion adapted to be mounted in a tool holder, and a cutter portion projecting from said base portion in a direction transversely relative to a forward direction of cutting said cutter portion including:

a chip face facing in the forward direction of cutting, a cutting edge bordering at least a portion of said chip face which is located remotely of said base portion, said cutting edge being intersected by a center plane of said insert which passes through said base portion and said chip face, said cutting edge comprising first and second cutting edge portions disposed on opposite sides of said center plane, said first and second cutting edge portions forming a rearwardly opening angle as viewed in a direction parallel to said center plane and perpendicular to said forward cutting direction, said angle being less than 180 degrees.

5. A slotter type broaching insert according to claim 4, wherein said first and second cutting edge portions lie in first and second reference planes, respectively.

6. A slotter type broaching insert according to claim 4, wherein said first and second reference planes form equal angles with said center plane.

7. A slotter type broaching insert according to claim 4, wherein said first and second reference planes form unequal angles with said center plane.

8. A slotter type broaching insert according to claim 7, wherein one of said reference planes is oriented perpendicular to said center plane and the other of said reference planes is angled rearwardly from said center plane.

9. A slotter type broaching insert according to claim 6, wherein both of said reference planes are angled rearwardly from said center plane.

10. A slotter type broaching insert according to claim 4, wherein said cutting edge comprises a center section intersected by said center plane and two side sections extending from opposite ends of said center section in a direction generally toward said base portion, whereby each of said first and second cutting edge portions comprises one of said side sections and a respective part of said center section.

11. A slot-completing broaching insert for performing a cutting operation with respect to sides of a roughed-out slot in a workpiece, comprising:

a base portion adapted to be mounted in a tool holder, and a cutter portion projecting from said base portion in a direction transversely relative to a forward direction of cutting, said cutter portion including:

a chip face facing in the forward direction of cutting, said chip face being bordered by an end edge and a pair of side cutting edges, said side cutting edges extending from said end edge toward said base portion along opposite sides of said chip face and being spaced from a center plane of said insert which passes through said base portion and said chip face, one of said side cutting edges disposed forwardly relative to the other of said side cutting edges, each of said side cutting edges including a scalloped region defined by a portion of said side cutting edge disposed forwardly relative to immediately adjacent portions thereof, in order to minimize the shock when said cutting edge engages a workpiece.

12. A slot-completing type broaching insert according to claim 11 wherein each of said side cutting edges includes two said scalloped regions.

13. A slot-completing broaching insert for performing a cutting operation with respect to sides of a roughed-out slot in a workpiece, comprising:

a base portion adapted to be mounted in a tool holder, and a cutter portion projecting from said base portion in a direction transversely relative to a forward direction of cutting, said cutter portion including:

a chip face facing in the forward direction of cutting, said chip face being bordered by an end edge and a pair of side cutting edges, said side cutting edges extending from said end edge toward said base portion along opposite sides of said chip face and being spaced from a center plane of said insert which passes through said base portion and said chip face, each of said side cutting edges including a scalloped region defined by a portion of said side cutting edge disposed forwardly relative to immediately adjacent portions thereof, in order to minimize the shock when said cutting edge engages a workpiece.

14. A slot-completing broaching insert according to claim 13, wherein each of said side cutting edges includes two said scalloped regions.

15. A broaching method for forming a slot in a workpiece comprising the steps of effecting relative linear movement between said workpiece and a broaching insert in a direction of cutting, with a face of said workpiece oriented obliquely relative to said direction of cutting, such that a pair of side cutting edges of said broaching insert contact said workpiece simultaneously, said broaching insert comprising a slot completing insert which widens and shapes a previously formed slot in said workpiece, said side cutting edges being scalloped whereby at least one portion of each said side cutting edge engages said workpiece face in advance of immediately adjacent portions of said cutting edge in order to minimize shock.

16. A broaching method according to claim 15, wherein an additional broaching insert comprises a slotter which roughs-out a slot in said workpiece.

17. A broaching method according to claim 15, wherein said side cutting edges form portions of a cutting edge which is intersected by a center plane of said insert, the initial contact between said workpiece and said cutting edge being made at a point of said cutting edge which is intersected by said center plane.

18. A broaching method for cutting a slot in a workpiece, comprising the steps of effecting relative linear movement between said workpiece and a slotter type of broaching insert in a direction of cutting to cause a cutting edge of said slotter insert to engage a face of said workpiece such that a center portion of said cutting edge contacts said workpeice ahead of opposing side portions of said cutting edge.

19. A broaching method according to claim 18, wherein said face of said workpiece is oriented obliquely relative to said direction of cutting, said side portions engaging said workpiece face simultaneously.

20. A broaching method according to claim 18, wherein said face of said workpiece is oriented perpendicularly relative to said direction of cutting, said side portions engaging said workpeice face simultaneously.

21. A method of broaching wherein a broaching insert is passed linearly through a workpiece from a front face to a rear face thereof to form a slot extending completely through said workpiece, the method including the step of gradually releasing a compressive load on said insert when said insert exits said workpiece by passing said insert sequentially through a plurality of back-up disks disposed at said rear face of said workpiece, said back-up disks being of less hardness than said workpiece and of sequentially reduced hardness relative to each other, whereby the compressive loading on said insert upon exiting said workpiece is gradually relieved as said insert sequentially passes through said back-up disks.

22. A method according to claim 21, wherein said insert is passed through more than two of said back-up disks.

23. A slot-completing broaching insert for performing a cutting operation with respect to sides of a roughed-out slot in a workpiece, comprising;
   a base portion adapted to be mounted in a tool holder, and
   a cutter portion projecting from said base portion in a direction transversely relative to a forward direction of cutting, said cutter portion including a chip face facing in the forward direction of cutting, said chip face being bordered by an end edge and a pair of side cutting edges, said side cutting edges extending from said end edge toward said base portion along opposite sides of said chip face and being spaced from a center plane of said insert which passes through said base portion and said chip face, one of said side cutting edges disposed forwardly relative to the other of said side cutting edges, said chip face being divided in half by a forwardly projecting center flange lying in said center plane.

24. A slot-completing broaching insert according to claim 23, wherein said insert is a semi-finisher.

25. A slot-completing broaching insert for performing a cutting operation with respect to sides of a roughed-out slot in a workpiece, comprising:
   a base portion adapted to be mounted in a tool holder, and
   a cutter portion projecting from said base portion in a direction transversely relative to a forward direction of cutting, said cutter portion including a chip face facing in the forward direction of cutting, said chip face being bordered by an end edge and a pair of side cutting edges, said side cutting edges extending from said end edge toward said base portion along opposite sides of said chip face and being spaced from a center plane of said insert which passes through said base portion and said chip face, one of said side cutting edges disposed forwardly relative to the other of said side cutting edges, said side cutting edges defining a generally fir-tree shape.

* * * * *

UNITED STATES PATENT AND TRADEMARK OFFICE
CERTIFICATE OF CORRECTION

PATENT NO. : 5,176,480

DATED : January 5, 1993

INVENTOR(S) : Walter H. Kelm

It is certified that error appears in the above-indentified patent and that said Letters Patent is hereby corrected as shown below:

Column 8, claim 1, line 1, change "slot-type" to -- slotter-type --.

Signed and Sealed this

Seventeenth Day of May, 1994

*Attest:*

BRUCE LEHMAN

*Attesting Officer*     *Commissioner of Patents and Trademarks*